T5195Y
X5554C
Jan. 26, 1971 H. B. MEAD ET AL 3,559,071
AUTOMATIC GAIN STABILIZATION AND CALIBRATION SYSTEM FOR A RADIO RECEIVER
Filed March 11, 1968
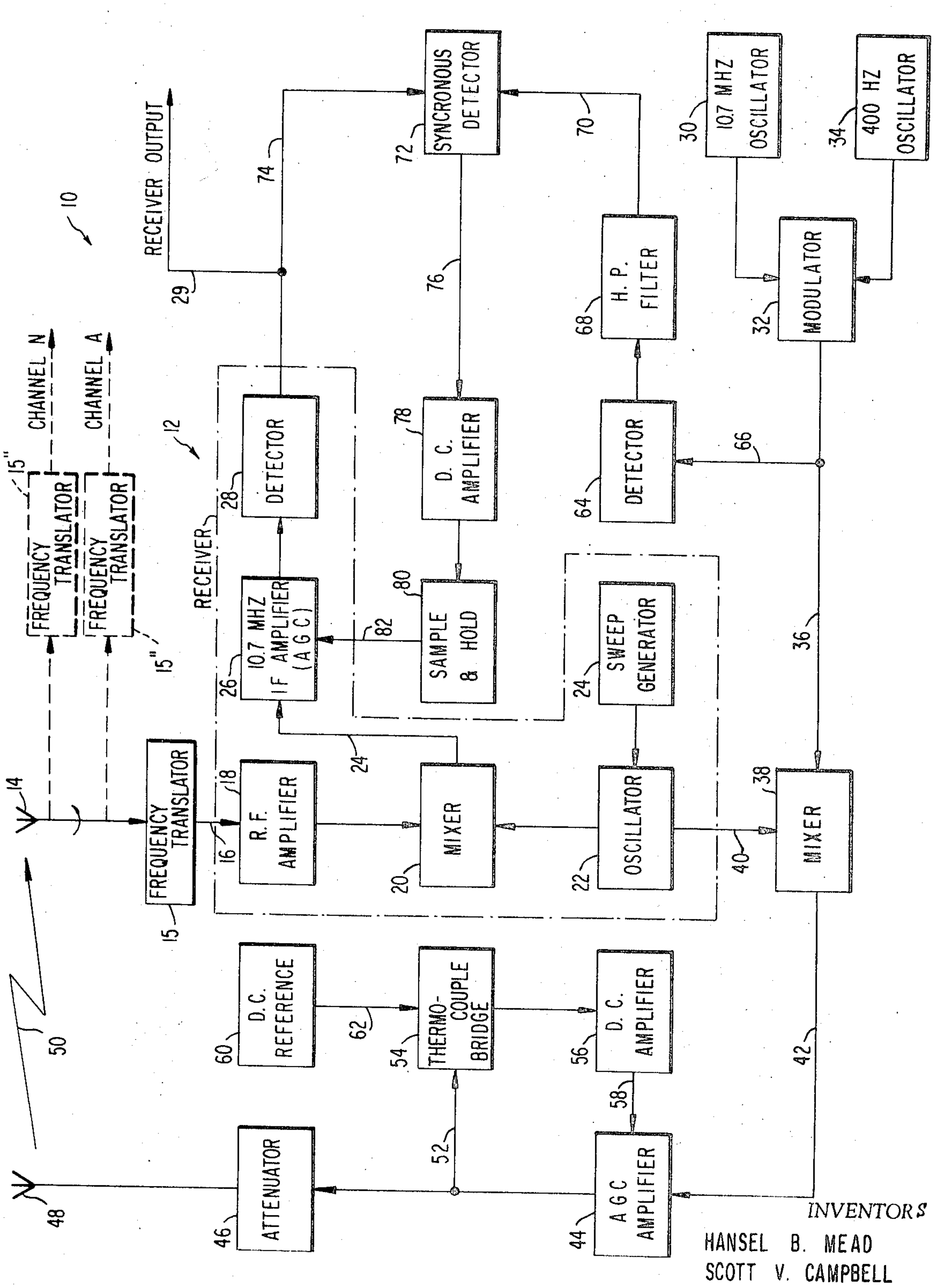
INVENTORS
HANSEL B. MEAD
SCOTT V. CAMPBELL
BY Le Blanc & Shur
ATTORNEYS 3,559,071

AUTOMATIC GAIN STABILIZATION AND CALIBRATION SYSTEM FOR A RADIO RECEIVER

Hansel B. Mead and Scott V. Campbell, Melbourne, Fla., assignors, by mesne assignments, to Teltronic Measurement Systems, Inc., New York, N.Y., a corporation of Delaware Filed Mar. 11, 1968, Ser. No. 712,294
Int. Cl. H04b 3/46
U.S. Cl. 325—363 16 Claims

ABSTRACT OF THE DISCLOSURE

Disclosed is an automatic gain stabilization and calibration system for a receiver. A receiver for monitoring local oscillator signals from television sets is provided with a directional sweep antenna and a calibrating antenna. As the radiation pattern of the sweep antenna passes over the calibrating antenna, a calibrating signal is sent from the latter to the former. This signal is at the frequency of the receiver IF and is first mixed with a sweep oscillator in the receiver. The transmitted signal passes through the receiver and is compared in a synchronous detector with the modulation on the unmixed calibrating signal. Any error output from the synchronous detector is used to correct the gain of a receiver amplifier.

This invention relates to a receiver for monitoring electrical signals from the local oscillators of radio and television sets and more particularly is directed to a system for providing automatic gain stabilization and calibration of a receiver adapted to be mounted on a tower to receive radiation from the local oscillators of television sets in the area of the tower.

With the increase in the cost of advertising time on radio and television stations and particularly television, sponsors have become more concerned with ascertaining the listening audience covered by advertising of this type. In recent years, television rating systems have received much publicity and are believed to have a significant effect on the lives of many television shows.

In assignee's U.S. Pat. No. 3,299,355, there is disclosed a system and method for monitoring radio and television receivers which, for the first time, rapidly acquires information in very large quantities. This overcomes the difficulties and disadvantages encountered in some other type systems which rely for their results on a very small sample of the television sets actually used in any given locality. The system of that patent is particularly designed for use in an aircraft but may also be used in a tower in conjunction with a rotating antenna at the receiver which rotates or otherwise sweeps over the area to be monitored. A somewhat modified system particularly suited for use in towers is disclosed in assignee's copending application Ser. No. 608,589, filed Jan. 11, 1967, now allowed.

The present invention is directed to a system of the same general type as that of assignee's patent and copending application mentioned above but in particular is directed to a system for automatically calibrating and stabilizing the gain of a monitor receiver. In the system disclosed, television viewer preferences are ascertained by scanning and detecting the re-radiation of signals from television set local oscillators. In order to obtain consistent accuracy the gain of each of the monitor receiver channels must be accurately stabilized to maintain a known sensitivity.

Such a stabilization system should, ideally, compensate for variations in all of the components of the receiving system. If the antenna is included in the calibration loop, as it should be, a number of special problems appear.

Furthermore, to eliminate problems of non-linearity and overloading, the input signal should be comparable in amplitude to the signals normally being detected. If the test signal is to be held to this level, the contribution of noise and various other signals will severely influence the calibration process.

Another problem arises from the fact that the local oscillator of the monitor receiver is being swept, so as to sweep the receiver across the band of frequencies occupied by the re-radiation from the television local oscillators. Since gain is of interest across this entire band of frequencies, and minor gain variations may exist across this band, gain calibration at a single frequency is not an acceptable approach. The system of the present invention eliminates all of these problems. It sweeps the calibration signals across the entire frequency band and is not influenced by noise and extraneous signals.

In the present invention, a calibration signal is provided preferably having the same frequency as the normal receiver IF. This calibration signal is mixed with the receiver local oscillator and the mixed signal transmitted by a separate antenna through a suitable attenuator. At the same time, the unmixed reference signal is modulated, detected and supplied to one input of a synchronous detector. The other input of the synchronous detector receives the calibration signal transmitted by the separate antenna when the two antennas are aligned and the synchronous detector output is amplified and fed to a sample and hold circuit for sweep averaging. The sample and hold supplies a signal to the AGC of an IF amplifier in the monitor receiver. The result is that the IF gain changes until the output of the synchronous detector approaches zero.

It is therefore one object of the present invention to provide a radio type receiver having improved gain stabilization.

Another object of the present invention is to provide a system for calibrating a radio type receiver.

Another object of the present invention is to provide an improved gain stabilization system for a radio and television monitor receiver.

Another object of the present invention is to provide automatic gain stabilization for a receiver having a local oscillator swept through a band of frequencies.

Another object of the present invention is to provide automatic gain stabilization and calibration in a multichannel receiver particularly adapted to be mounted on a tower to monitor the outputs from a plurality of radio and television receiving sets and in particular adapted to detect signals generated or re-radiated by the local oscillators of television receiving sets.

These and further objects and advantages of the invention will be more apparent upon reference to the following specification, claims and appended drawings wherein:

The single figure of the drawing is a block diagram of a receiver gain stabilization system constructed in accordance with the present invention.

In the preferred embodiment, the monitor receiver of the present invention is adapted to be mounted on a tower and is used in conjunction with a directional antenna that is rotated or otherwise swept over a metropolitan area adjacent the tower to detect local oscillator signals radiated from home sets, particularly television sets. The monitor of the present invention is used in conjunction with other similar monitors mounted on other towers in the same or different metropolitan areas and is used to compile data on the listening habits of television set users. This data may be used in compiling ratings representative of the percentage or share of listening audience that a particular program or particular television station may have at a given time. While the system of the present invention is described in conjunction with a preferred monitor type receiver, it will be apparent from the following description that the gain stabilization system is applicable to all types of radio receivers and particularly those types in which the receiver incorporates a local oscillator swept through a band of frequencies.

Referring to the single figure of the drawing, the calibrated gain stabilization system of the present invention, generally indicated at 10, comprises a receiver indicated by the dashed box 12 coupled to a rotatable antenna 14 for receiving radiation from television receiving sets. Antenna 14 is preferably of the directional type and may be either physically or electrically rotated or otherwise swept over a metropolitan area so as to pick up most if not all of the local oscillator signals from the television sets in the surrounding area. The receiver 12 and antenna 14 are adapted to be mounted on a tower extending above the buildings in the area to be covered so as to provide relatively direct and unobstructed radiation paths from the receiving sets to the monitor receiver 12. It is further adapted to be used with similar monitor receivers mounted on other towers either in the same or in different metropolitan areas.

Receiver 12, as illustrated in the drawings, is shown as comprising only a single channel for the sake of clarity. It is understood that in actual practice, the monitor receiver 12 has a plurality of channels, such as those indicated by dashed lines as channel A and channel N, each adapted to receive a different frequency band of local oscillator signals corresponding to those sets tuned to the different television transmitting stations or channels. In all cases, the gain stabilization for each additional channel is identical to that shown for the single channel illustrated and the details of the remaining channels in the receiver are omitted for the sake of clarity of description.

Each channel in the receiver is supplied by a frequency translator 15 tuned to a different local oscillator frequency band. The frequency translators are of conventional construction and operate to translate the different received frequency bands into a common RF band so that the remaining portions of each channel are identical to the channel described in detail below. Reference may be had to assignee's U.S. Pat. No. 3,299,355 for a description of a multi-channel receiver, also having at least one separate channel for each local television station and it is understood that the receiver 12 of the present invention may be similarly constructed.

Each channel of the receiver is coupled to the antenna 14 by way of its translator 15 and lead 16 and comprises an RF amplifier 18, mixer 20, local oscillator 22, and sweep generator 24. Sweep generator 24 generates a ramp type signal which, in a well known manner, varies a reactance diode or other parameter of the oscillator 22 in a saw tooth manner to cause the output of the oscillator 22 to sweep through a band of frequencies. By way of example only, the output of oscillator 22 may sweep through a bandwidth of from 3 to 4 megahertz centered about a frequency of 101.55 megahertz. The oscillator output is combined in mixer 20 with the incoming local oscillator signal passed through RF amplifier 18 from antenna 14. In the preferred embodiment, the sweep generator 24 and oscillator 22 are common to all receiver channels, the remaining channels having separate translators, RF amplifiers, mixers, etc., the translators receiving different frequency bands 3 to 4 megahertz wide and operating at frequencies corresponding to the settings of local oscillators tuned to respective television stations in the area.

The output from mixer 20 is fed by way of lead 24 to an automatic gain control IF amplifier 26 tuned to a frequency of 10.7 megahertz. The output from IF amplifier 26 is passed to a demodulator detector 28 and from the detector by way of lead 29 to suitable filters, decision circuits, and/or counting and/or indicating devices for counting the number of impulses passed through the receiver channel. Reference may be had to assignee's U.S. Pat. No. 3,299,355 for a more detailed disclosure of the operation of the remaining portions of receiver 12.

Briefly, the receiver operation is based on the fact that while all television receiving sets tuned to the same television station have local oscillators theoretically operating at the same frequency, the oscillator frequencies in fact differ widely depending upon the fine tuning and the particular parameters of the specific receiving set. It has been found that most of the local oscillators tuned to the same television station operate at frequencies existing within a frequency band approximately 3.5 megahertz wide. When the frequency of oscillator 22 momentarily differs from the frequency of a television set local oscillator signal passed by the translator 15 through RF amplifier 18 by an amount equal to the IF frequency, an impulse is generated and passed through the IF amplifier and remainder of the channel where it is detected and counted to indicate or display the total number of impulses passed through the channel. Other channels in the receiver 12 are of identical construction but have translators which receive a different frequency band corresponding to television set local oscillator settings for a different station and generate impulses which are similarly detected.

In the system of the present invention, there is provided, at the site of receiver 12, a 10.7 megahertz oscillator 30 for generating a calibrating signal at the same frequency as the frequency of the IF amplifier 26 incorporating an automatic gain control circuit. The signal from oscillator 30 is passed through a modulator 32 where it is modulated by a signal from 400 hertz oscillator 34. The modulated reference or calibration signal from oscillator 30 then is passed by way of lead 36 to a mixer 38 where it is mixed with the output of swept oscillator 22, this output being supplied to mixer 38 by way of lead 40. Mixer 38 in turn supplies a signal by way of lead 42 to a gain controlled RF amplifier 44 and through an attenuator 46 to a separate antenna 48 where the calibrating signal is radiated through space as indicated at 50 to receiver antenna 14. The gain of RF amplifier 44 at the calibrating signal output to separate antenna 48 is stabilized by a feedback loop including lead 52, a thermo-couple bridge 54, DC amplifier 56, and AGC lead 58. The thermo-couple bridge is controlled from a DC reference source 60 by way of lead 62.

The modulated reference or calibration signal is also supplied to a demodulator detector 64 by lead 66 connected to the output of modulator 32. The detected modulation envelope is passed through a high pass filter 68 and is supplied by way of lead 70 to one input of a synchronous detector 72. The other input of synchronous detector 72 is connected to receiver 12 and specifically by way of lead 74 to the output of channel detector 28. Any error signal developed in synchronous detector 72 is supplied by its output lead 76 to a DC amplifier 78 in turn feeding a sample and hold circuit 80. The output from sample and hold circuit 80 is fed by way of lead 82 to the AGC input of IF amplifier 26 so as to control the gain of that amplifier.

An important feature of the present invention resides in the fact that the modulated calibration signal from oscillator 30 is mixed in mixer 38 with the swept frequency output of the local oscillator 22. Since the same local oscillator feeds both the receiver mixer and the signal generator mixer, and since 10.7 megahertz is also the IF frequency, the output frequency will be the frequency that the receiver is turned to throughout the sweep.

The output of mixer 38 is amplitude stabilized by the AGC loop. This loop consists of the thermo-couple bridge 54 with the DC reference from source 60 going in one side and the RF from lead 52 into the other. The error signal from the bridge is then amplified in DC amplifier 56 and used to control the gain of RF amplifier 44. The RF amplifier output is attenuated in attenuator 46 so that the signal coming from the calibrating antenna 48, which is located at the site of the receiver and spaced only a small distance from antenna 14, is at the same general level as normally encountered signals from the television sets.

To eliminate the influence of unwanted signals during calibration, a synchronous detection system is used. The 10.7 megahertz signal from oscillator 30 is modulated by a 400 hertz audio tone. The envelope of this modulated signal is detected in detector 64 and the DC component, carrier amplitude, is removed by filter 68. This separate detector and filter is used to eliminate any drift resulting from instability in the modulator 32. The detected output is then fed to the synchronous detector 72. The other input to the synchronous detector is the AM detected output of the receiver. Since the synchronous detector only responds to signals that are phase coherent, noise and extraneous signals do not cause any gain bias errors.

The synchronous detector produces a DC output proportional to the relative amplitude of its two inputs. Variations in modulation percentage do not result in an error since the percentage increase in reference signal is the same as the percentage increase in the received signal.

The output of the synchronous detector is amplified and stored in a sample and hold circuit 80. The analog error signal, after amplification in DC amplifier 78, is fed as an AGC control voltage to the 10.7 megahertz receiver IF amplifier 26. The IF gain of this amplifier 26 changes until the output of the synchronous detector approaches zero. The sample and hold circuit then holds this AGC voltage until the next calibration cycle, i.e., until the radiation pattern of antenna 14 again sweeps over the area of calibration antenna 48.

The output of the synchronous detector is integrated over an entire sweep of the oscillator 22 so that the gain is adjusted to an average value which is best over the entire band. This minimizes the effects of ripple in the passband. In the preferred embodiment, the sweep generator 24 is synchronized with the rotation or other sweep cycle of receiver antenna 14 so that oscillator 22 sweeps through the band once each time antenna 14 advances a full width of its radiation pattern.

It is apparent from the above that the present invention provides a novel system for stabilizing the gain of a radio type receiver, that is a receiver operating at radio, television, or similar frequencies. Important features of the present invention include the provision of a calibrating signal of the same frequency as the signal to which a sweep frequency receiver is tuned throughout its cycle. At the same time, the calibrating signal is mixed with the sweep signal from the receiver local oscillator so that the signals at all times coincide. The calibrating signal is transmitted through a suitable attenuator from a separate calibrating antenna located at the site of the receiver but slightly spaced from it. The modulation on the calibration signal is also supplied to a synchronous detector to eliminate the effects of noise and undesired signals when the synchronous detector compares the calibration signal with the output of a receiver channel. Error signals developed by the synchronous detector are supplied to an outomatic gain control circuit in the receiver channel so as to automatically adjust receiver channel gain.

While, for the sake of clarity, only a single channel has been shown or described, it is understood that in the preferred embodiment, the receiver incorporates a plurality of channels and specifically at least one channel for each television station in the area of the receiver to which television sets may be tuned. Likewise, while the invention has been described in conjunction with a television set monior, it is apparent that the calibration and automatic gain stabilization system of the present invention is usable with all types of receivers and especially receivers utilizing a local oscillator such as the oscillator 22 which is periodically swept through a band of frequencies.

Several additional features may be incorporated in the stabilization system of the present invention if desired. Briefly, frequency translators may be provided to produce a swept output corresponding to the local oscillators for each television channel to be examined. Additionally, a power combiner may be provided to add these various frequencies, prior to the standard signal antenna. A timing system may be incorporated to keep track of the antenna position to trigger a calibration cycle each time the survey antenna 14 is pointed at the standard antenna 48. This timing system may also inhibit the receiver output calibration and control the operation of the sample and hold.

If desired, a bandpass amplifier and phase adjustment amplifier may be added to the inputs to the synchronous detector to further eliminate noise and adjust for system phase shift. Finally, a feedback loop may be added around the modulator 32 to improve the stability of modulated signal generator. These and other improvements and modifications will readily occur to those familiar with systems of this type.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by United States Letters Patent is:

1. In a receiver having an antenna and at least one variable gain element, the improvement comprising a separate antenna, means for supplying a calibrating signal to said separate antenna whereby it is transmitted to said receiver and passes through said variable gain element, a comparator coupled to receive a portion of the output from said variable gain element, means coupled to said comparator for supplying said calibrating signal to it through a path bypassing said receiver whereby said comparator compares said transmitted signal with said bypass signal and produces an error output representative of the difference between said two signals, and means coupling the output of said comparator to said variable gain element to correct the gain of said element in accordance with the magnitude of said error signal.

2 Apparatus according to claim 1 wherein said comparator comprises a synchronous detector.

3. Apparatus according to claim 1 wherein said receiver includes an oscillator and said calibrating signal is mixed with a signal from said oscillator before it is transmitted by said separate antenna.

4. Apparatus according to claim 3 wherein said oscillator is a sweep oscillator whose output periodically sweeps through a predetermined frequency band.

5. Apparatus according to claim 1 wherein said variable gain element is an IF amplifier and said calibrating signal is at the IF frequency of said receiver.

6. A receiver for monitoring radio and television sets comprising a directional sweep antenna, a calibrating antenna adjacent to but spaced from said sweep antenna, an automatic gain control amplifier coupled to said sweep antenna, a calibrating signal source, means coupling said source to said calibrating antenna whereby a calibrating signal is radiated from said calibrating antenna to said sweep antenna when said antennas are aligned, said calibrating signal received by said sweep antenna passing through said amplifier, a synchronous detector, means coupling a portion of the output from said amplifier to one input of said synchronous detector, means coupling said calibrating source to the other input of said detector, and means coupling the output of said synchronous detector to the gain control element of said amplifier.

7. Apparatus according to claim 6 including a sweep oscillator coupled to said sweep antenna for heterodyning the signal from said sweep antenna to said amplifier, and means coupled to said oscillator for combining the output of said sweep oscillator with the signal from said calibrating source before it is supplied to said calibrating antenna for transmission.

8. Apparatus according to claim 7 including a storage circuit between the output of said detector and said amplifier for storing the output of said detector over a full sweep of said sweep antenna.

9. Apparatus according to claim 8 wherein said storage circuit comprises a sample and hold circuit.

10. Apparatus according to claim 7 including an attenuator coupled to said calibrating antenna for attenuating the calibrating signal transmitted from said antenna.

11. Apparatus according to claim 7 including a demodulator detector coupling said amplifier to said synchronous detector, means coupled to said source for modulating said calibrating signal and an audio tone, and a second demodulating detector coupling said modulated calibrating signal to said synchronous detector.

12. A receiver for monitoring local oscillator signals from television receiving sets comprising a directional sweep antenna, a calibrating antenna adjacent to but spaced from said sweep antenna, an RF amplifier coupled to said sweep antenna, a sweep oscillator in said receiver, a mixer coupled to both said RF amplifier annd said sweep oscillator, a gain control amplifier tuned to a predetermined IF frequency coupled to the output of said mixer, a synchronous detector in said receiver, means coupling a portion of the output from said gain control amplifier to one input of said synchronous detector, an IF frequency source in said receiver, a second mixer in said receiver coupled to both said source and said sweep oscillator, means coupling the output of said second mixer to said calibrating antenna whereby a calibrating signal from said IF source is transmitted from said calibrating antenna to said sweep antenna when said antennas are aligned, means for feeding a portion of the signal from said IF source directly to the other input of said synchronous detector, a storage circuit coupled to the output of said synchronous detector, and means coupling the output of said storage circuit to the gain control element of said amplifier.

13. Apparatus according to claim 12 including a gain control circuit coupled between the output of said second mixer and said calibrating antenna.

14. Apparatus according to claim 13 wherein said gain control circuit comprises a second gain control amplifier and a thermocouple bridge connected in a gain control loop.

15. Apparatus according to claim 12 wherein said IF amplifier is tuned to a frequency of approximately 10.7 megahertz and said source produces a signal of the same frequency.

16. Apparatus according to claim 12 including a first demodulator detector coupled between said IF amplifier and said one input of said synchronous detector, a modulator coupled to the output of said source for modulating the source output with an audio tone, and a second demodulator detector and a high pass filter coupling said modulator to said other input of said synchronous detector.

References Cited

UNITED STATES PATENTS

| | | | |
|---|---|---|---|
| 3,273,065 | 9/1966 | Stover | 325—67 |
| 3,332,019 | 7/1967 | Leostic et al. | 325—363 |

ROBERT L. RICHARDSON, Primary Examiner

U.S. Cl. X.R.

325—67, 31